SAMUEL A. MOREY.
Improvement in Embalming Birds.
No. 125,685.
Patented April 16, 1872.
Witnesses.
N. A. Fletcher
Edward Taggart
Inventor.
Samuel A. Morey 125,685

UNITED STATES PATENT OFFICE.

SAMUEL A. MOREY, OF GRAND RAPIDS, MICHIGAN.

IMPROVEMENT IN EMBALMING BIRDS.

Specification forming part of Letters Patent No. 125,685, dated April 16, 1872; antedated April 3, 1872.

*Know all men by these presents:*

That I, SAMUEL A. MOREY, of the city of Grand Rapids, county of Kent and State of Michigan, have invented a certain new and useful Breast-Plate to be used in Embalming Birds, of which the following is a full, clear, and sufficient description thereof, reference being had to the accompanying drawing and the letters of reference marked thereon, and the same are made a part of this specification.

The nature of my invention relates to a metallic plate of suitable size to be placed upon the breast of an embalmed bird under the skin to prevent the breast of the embalmed bird from shrinking away.

In the drawing the figure represents the plate in perspective, showing its convex surface. It is constructed of any suitable material and in form resembling the bowl of an ordinary tablespoon at the broadest, and (what is when placed upon the bird) the upper part is a wedge-shaped slot or opening, as shown in the figure by letter B. The object of the opening described is to allow the neck of the bird to which the plate is applied to pass through. The size of the opening depends upon the position the neck of the bird is to assume after it is embalmed, and in some cases the slot or opening can be done away with entirely.

In using my invention, the bird may be embalmed in any manner. The breast of the bird is then laid bare by slitting the skin and pulling it apart a sufficient distance to allow the plate to be inserted. The skin is then drawn back to its original position and properly secured.

Having thus described my invention, what I claim to have invented, and desire to secure by Letters Patent, is—

A metallic breast-plate to be used in embalming birds, when constructed and used substantially as and for the purposes above set forth.

SAMUEL A. MOREY.

Witnesses:
  N. ALLAN FLETCHER,
  EDWARD TAGGART.